United States Patent
Victor et al.

[11] Patent Number: 5,964,877
[45] Date of Patent: Oct. 12, 1999

[54] METHOD AND SYSTEM FOR PROGRAMMING A SECURITY SYSTEM TO PROTECT A PROTECTED UNIT

[76] Inventors: David William Victor, 11810 Mayfield Ave., Apt. #206, Los Angeles, Calif. 90049; David Ian Reiner, 827 Second St., Apt. #207, Sanata Monica, Calif. 90403

[21] Appl. No.: 08/834,953

[22] Filed: Apr. 7, 1997

[51] Int. Cl.⁶ .................................................. G06F 15/00
[52] U.S. Cl. ...................... 713/202; 340/825.31; 709/217
[58] Field of Search .................. 395/188.01, 187.01, 395/186, 200.46, 200.47, 200.49; 380/25, 30, 43, 56, 59; 340/825.31, 825.32; 714/200, 201, 202; 709/217, 219

[56] References Cited

U.S. PATENT DOCUMENTS

| | | | |
|---|---|---|---|
| 4,023,139 | 5/1977 | Samburg | 340/506 |
| 4,310,720 | 1/1982 | Check | 178/22.08 |
| 4,366,466 | 12/1982 | Lutz | 340/64 |
| 4,447,890 | 5/1984 | Duwell et al. | 364/900 |
| 4,494,114 | 1/1985 | Kaish | 340/825.31 |
| 4,604,708 | 8/1986 | Lewis | 364/900 |
| 4,689,610 | 8/1987 | Dietrich | 340/515 |
| 4,887,064 | 12/1989 | Drori et al. | 340/426 |
| 4,926,665 | 5/1990 | Stapley et al. | 70/277 |
| 5,416,471 | 5/1995 | Treharne et al. | 340/825.31 |

*Primary Examiner*—Dieu-Minh T. Le

[57] ABSTRACT

A security system for protecting a protected device including control circuitry, a non-volatile memory, a data transceiver, and input keys. A remote activation unit, including a non-volatile memory, data transceiver, and input key, is used to access the protected unit by communicating a code stored in the memory of the activation unit to the protected unit via data transceivers. If the activation unit is lost or the user desires to change the password, the user may enter a new password using the input keys of the protected unit, which is then stored in the non-volatile memory of the protected unit. The user may then initiate a password programming operation, which would involve the communication of the new password entered by the user to the remote activation unit via the data transceivers. Once the remote activation unit receives the new password, it would then store the new password in the non-volatile memory of the activation unit.

36 Claims, 6 Drawing Sheets

METHOD AND SYSTEM FOR PROGRAMMING A SECURITY SYSTEM TO PROTECT A PROTECTED UNIT

FIELD OF THE PRESENT INVENTION

The present invention relates to a security system for a protected unit which may be controlled from a remote activation unit, wherein a password code for both the activation unit and protected unit may be programmed.

BACKGROUND OF THE INVENTION

Prior art security systems for electronic and other devices require the entry of a code at a keypad to allow the device to be used. One such security system is described in U.S. Pat. No. 4,604,708, entitled "Electronic Security System for Externally Powered Devices," by Gainer R. Lewis. This patent describes a security system, wherein the user must reenter a code whenever the protected device is reconnected to a power source. However, the user does not have to reenter the code each time the power switch is turned on and off. When the correct code is entered, power is then coupled to the protected device. Other security systems, such as home alarm or car entry systems require the user to enter the code upon each entry attempt.

The problem with coded security systems, such as that described above, is that the user often forgets the password provided by the manufacturer. Further, the user cannot easily program the password to make it easier to remember, like a significant other's name, or immediately program the password to prevent others who know the password from accessing the protected device.

Still further, users may want to require password entry upon each use, such as to protect a car, house, etc, not only when the protected unit is reconnected to a power source. Requiring manual entry of the password for each use would be tedious. To make it easy for the user to enter the password upon each use, current security systems, such as car alarms, allow the user to disable the alarm from a remote activation unit. However, these remote devices are not easily and immediately programmable. With prior art remote activation units, the user is relying on passwords selected by the manufacturer which are pre-installed in both the protected unit and the remote activation unit. Furthermore, the user must rely on the manufacturer to provide a properly coded replacement remote activation unit. This situation may be problematic because in many instances it may be difficult or unfeasible for the user to contact the manufacturer and immediately program the password or obtain a new activation unit.

Alternatively, some prior art systems allow the user to manually change the password code stored in the protected unit and activation unit by pushing switches to an on/off position. However, these systems too are problematic because anyone who can gain physical access to the switches can program the password.

The problem with present security systems can be illustrated with the current situation in the car stereo market. Some car stereos require the entry of a code only when the car stereo is reconnected to the battery. The problem with this system is that if the user gets a battery recharge a considerable time after writing down the password, the user may not have the password readily available when it is needed, i.e., when they get "jump started" on an automobile trip far from home. In such case, the user cannot use the car stereo until the manufacturer is contacted and provides the code. This set-up could be extremely inconvenient, especially if the password is lost on a holiday weekend or in a location where the manufacturer may not be easily contacted.

Other car stereos have a removable face plate which prevents the stereo from being used. However, the removable face plate also has problems. The face plate is bulky and, thus, a burden for the driver to have to carry every time the driver leaves the car. Moreover, the face plate is very expensive to replace. In fact the replacement cost is a significant portion of what the entire car stereo cost in the first place.

Still further, none of the current car stereo systems allow the user to access the car stereo using a remote activation or allow the user to easily program the security code in both the car stereo and remote activation unit.

SUMMARY OF THE DISCLOSURE

It is an object of the present invention to provide an improved method and apparatus for allowing users to access a protected unit with an activation unit and allowing users to program a password code in both the activation unit and protected united.

These and other objects and advantages are achieved by, in accordance with one aspect of the invention, a security system for protecting a protected unit, wherein a user may gain access to the protected unit with an activation unit and enter a new code in both the protected unit and activation unit. The activation unit includes a memory storing a code, a data port for bi-directional communication with a remote source, and control circuitry coupled to the memory and data port. The control circuity can cause the code stored in the memory to be communicated to the data port. In preferred embodiments, the activation unit includes an input key, wherein the control circuitry of the activation unit communicates the code stored in the memory to the data port in response to the user selection of the input key. The control circuitry of the activation unit further writes data communicated to the data port of the activation unit to the memory for storage therein.

The protected unit includes a memory storing a code, a plurality of user selectable input keys, a data port for bi-directional communication with the data port of the activation unit, and control circuitry coupled to the memory, plurality of input keys, and the data port. The control circuitry can determine if a code communicated to the protected unit is identical to a code stored in the memory. In preferred embodiments, a code may be communicated to the protected unit via the data port or input keys of the protected unit. If the code communicated to the protected unit matches a code stored in the memory of the protected unit, then the control circuitry generates a control signal to control an operation within the protected unit.

The control circuitry of the protected unit can further write a new code in the memory of the protected unit. In preferred embodiments, the user enters the new code with the input keys of the protected unit. After the new code is entered, the control circuitry of the protected unit communicates the entered code to the data port, and causes the data port to communicate the entered code to the data port of the activation unit. Upon receiving the entered code, the control circuitry of the activation unit writes the entered code communicated from the protected unit to the memory of the activation unit.

In preferred embodiments the data ports for the activation unit and protected unit are data transceivers which provide wireless data communication therebetween. Alternatively, the data ports may be coupled to a data communication line which provides data communication between the protected unit and activation unit. In yet further embodiments, the data port of the activation unit may physically mate with the data port of the protected unit to provide data communication.

In preferred embodiments, the control circuitry of the protected unit and/or activation unit is implemented as a microprocessor operating under stored program control. In other embodiments, the control circuitry of the protected unit and/or activation unit are implemented as dedicated logic circuitry.

In certain embodiments, the protected unit includes an alarm, wherein the signal generated upon a match of a code entered via the input keys or remote activation unit and a code stored in the memory of the protected unit disables the alarm system. In other embodiments, the protected unit includes a subcomponent and a blocking circuit, wherein the blocking circuit will only allow power, data or control signals to flow to the subcomponent within the protected unit if the code entered via the activation unit or input keys matches a code stored in the memory of the activation unit. The protected unit will not fully operate or be accessible until the blocking circuit receives the control signal, to allow the necessary power, data or control signals to flow to the subcomponents of the protected unit.

In this way, the present invention provides a security system which allows the user to easily access and/or use the protected unit using the activation unit. In certain embodiments, in the event that the activation unit is unavailable, the user may use the input keys of the protected unit to access the protected unit. Nonetheless, it is generally intended that it be more convenient to access the protected unit using the activation unit.

In preferred embodiments, the user may enter a new code with the input keys of the protected unit, which is then stored in the memory. The control circuitry of the protected unit would then cause the transfer of the entered code to the data port, which then communicates the entered code to the data port of the activation unit. The control circuitry of the activation unit would then write the entered code to the memory of the activation unit.

In this way, the present invention provides a system and secure method for programming a code in the protected unit and activation unit. The present invention makes it both easy and convenient for the user to access the protected unit and program the security code in both the protected unit and activation unit. Moreover, the user can easily access the protected unit using the input keys if the remote activation unit is lost. Still further, the user can perform all access and code programming operations without having to rely on a third party or additional equipment for assistance or replacement of the activation unit. Yet further, the remote activation may be comprised of relatively inexpensive electronic components, which may be replaced and programmed with minimum expenditure in accordance with the present invention.

BRIEF DESCRIPTION OF THE DRAWINGS

A detailed description of embodiments of the present invention will be made with reference to the accompanying drawings, wherein like numerals designate corresponding parts in the several figures.

DETAILED DESCRIPTION OF THE PREFERRED EMBODIMENTS

The present invention is described with respect to the preferred embodiments discussed below.

First Set of Preferred Embodiments

Figure 1:
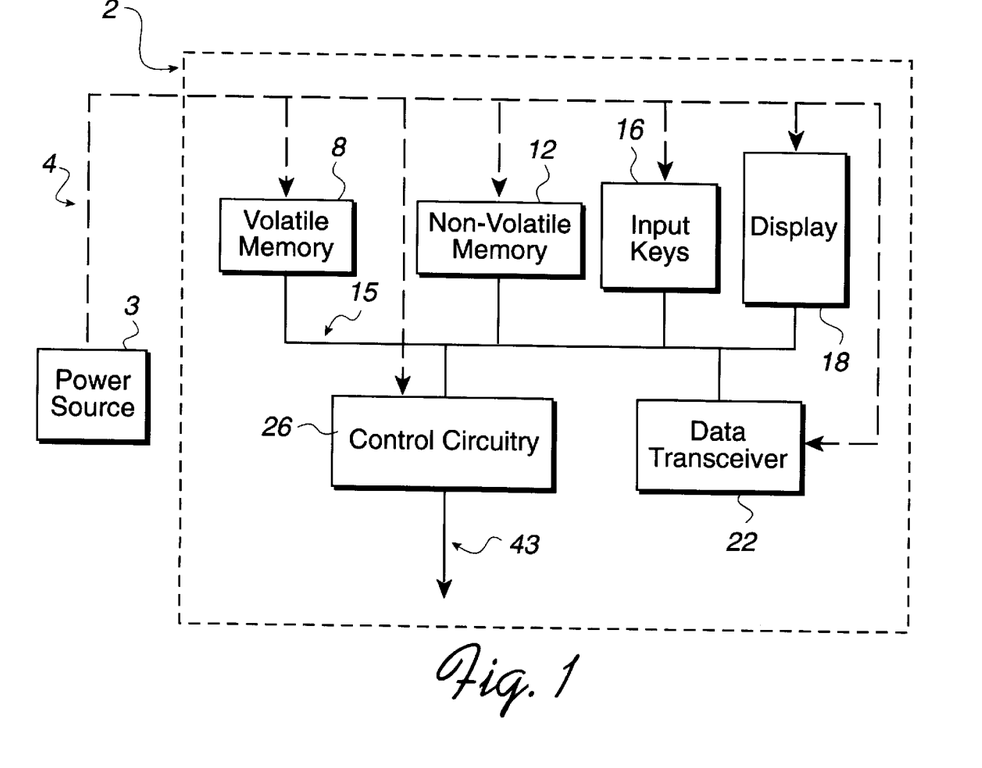
FIG. 1 is a schematic block diagram of how the components of the security system of the present invention may be located in a protected unit in preferred embodiments.
Figure 2:
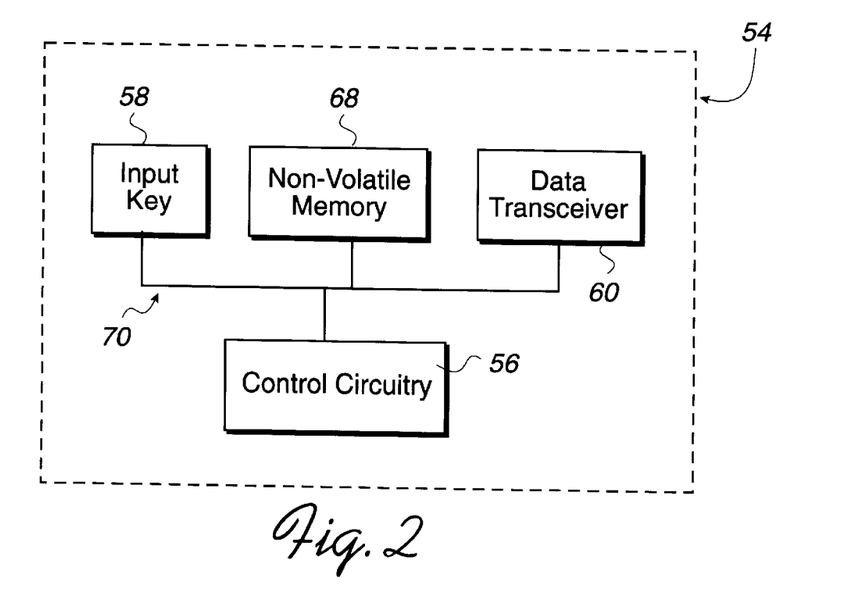
FIG. 2 is a schematic block diagram of the components of a remote activation unit in accordance with preferred embodiments of the present invention.

A first set of preferred embodiments of the present invention are described with reference to the schematic diagrams in FIGS. 1 and 2. FIG. 1 shows how the components of the security system may be located within a protected unit 2. FIG. 2 illustrates an activation unit 54 used with the security system of the present invention to enable a user to access and use the protected unit 2. With reference to FIG. 1, components of the security system located with the protected unit 2 receive power from a power source 3 via a power line 4. The power source 3 can be located external to or within the protected unit 2, such as the case with a removable battery pack. Alternatively, the power source 3 can be a wall outlet. FIG. 1 shows a preferred embodiment of the security system components, including a volatile memory 8, non-volatile memory 12, plurality of input keys 12, display 18, data transceiver 22, and control circuitry 26.

The security system of the protected unit 2 operates under control of the control circuitry 26. If the protected unit 2 includes additional electronic subcomponents, then the control circuitry 26 may also control those additional subcomponents. The control circuitry 26 can consist of numerous control structures known in the art such as a microprocessor or ALU operating under stored program control, wherein the program, i.e., instruction set, controlling the control circuitry 26 is stored within a memory suitable for storing such a program, such as a read only memory (ROM) which may be internal or external to the control circuitry 26. A random access memory (RAM) may be used by the control circuitry 26 for storing constants and operands used during processing. Such a RAM used by the control circuitry 26 may be the volatile memory 8 or some other storage registers. The control circuitry 26 may also be comprised of a hardware implementation using dedicated logic circuits as opposed to a microprocessor operating under stored program control.

The non-volatile memory 12 is used to store a password code, and may be comprised of any suitable non-volatile read/write memory known in the art, such as an EEPROM. A non-volatile RAM may be used, which may be comprised of a battery backed-up SRAM or CMOS RAM chip. Alternatively a flash memory device, Miniature Card or flash disk, such as a solid state floppy disk card (SSFDC) and other similar devices, may also be used.

The display 18 is designed to display messages to the user of the protected unit concerning security system operations. The display 18 can be comprised of a display device well known in the art, including liquid crystal display type devices.

The input keys 16 are used by the user to enter information interpreted by the control circuitry 26. In preferred embodiments, each input key may be labeled with a single character or number, or each key may be associated with a plurality of characters and numbers, such as is the case with a standard telephone keypad. Alternatively, the user may select alpha-numeric characters by scrolling through a list of such characters using one input key to scroll and another input key to select a character from the scrolled list. In yet further embodiments, the input keys 16 may replaced by any system known in the art for entering data which is stored in memory, such as a voice activated data entry system or other user selectable data input means.

The data transceiver 22 may be any suitable device for transmitting and receiving wireless communications. The data transceiver 22 may be capable of transmitting and receiving radio signals. Alternatively, the data transceiver 22 may be an infrared transceiver with an infrared port, such as a small area infrared system. However, any wireless communication system may be employed in the data transceiver 22.

In preferred embodiments, the data transceiver 22 includes a link management protocol which provides rules for communication with an external transceiver, providing protocol for detection and retransmission of lost data and a flow control protocol to insure acceptance of all delivered data. In infrared data transceivers, the link management protocol may include the Infrared Link Access Protocol (IrLAP) promoted by the Infrared Data Association (IrDA). Alternatively, the data transceiver 22 may be compatible with different types of communication protocols, such as is disclosed in U.S. Pat. No. 5,557,634, entitled "Multiprotocol Directed Infrared Communication Controller," to Peruvemba S. Balasubramanian et al.

If the data transceiver 22 utilizes infrared technology, then it may include an infrared transmitter, such as an infrared light emitting diode, and an infrared receiver, such as a photo diode or a photo-transistor, and appropriate control circuitry, such as a UART. The data transceiver 22 functions may be performed by the control circuitry 26, processing circuitry within the data transceiver 22 unit or a combination thereof. Data communication using infrared transceivers is well known in the art and is described in U.S. Pat. No. 5,440,559, entitled "Portable Wireless Communication Device," to Garold B. Gaskill and U.S. Pat. No. 5,563,728, entitled "Infrared Communication Repeater Architecture," to Richard C. Allen et al.

As shown in FIG. 1, a common I/O bus 15, such as is well known in the art, provides bi-directional communication between the display 18, input keys 16, non-volatile memory 12, volatile memory 8, control circuitry 26, and data transceiver 22. Alternatively, these components may be interconnected by various dedicated lines.

A preferred embodiment of the activation unit 54 is discussed with reference to FIG. 2. The activation unit 54 operates under control of control circuitry 56. The control circuitry 56 may be a microprocessor operating under program control or dedicated logic circuitry, such as those control circuitry embodiments described above with respect to the control circuitry 26 of FIG. 1. A data transceiver 60 is comprised of any suitable wireless communication device which is compatible and is capable of bi-directional communication with the data transceiver 22 of the protected unit 2.

The activation unit 54 further includes a non-volatile read/write memory 68, which stores a code. The non-volatile memory 68 may be comprised of any suitable non-volatile read/write memory, such as those memory devices described above with respect to the non-volatile memory 12 of the protected unit 2. An activation key 58, upon user activation, signals the control circuitry 56 to communicate the code stored in the non-volatile memory 68 to the data transceiver 60, which then communicates the code to the data transceiver 22 of the protected unit 2.

A common I/O bus 70, such as is well known in the art, provides bi-directional communication among the input key 58, control circuitry 56, non-volatile memory 68, and data transceiver 60. Alternatively the bus 70 may be comprised of dedicated lines which provide such bi-directional communication among the components.

The activation unit 54 may be powered by a lithium battery, or any other suitable power source.

Figure 3:
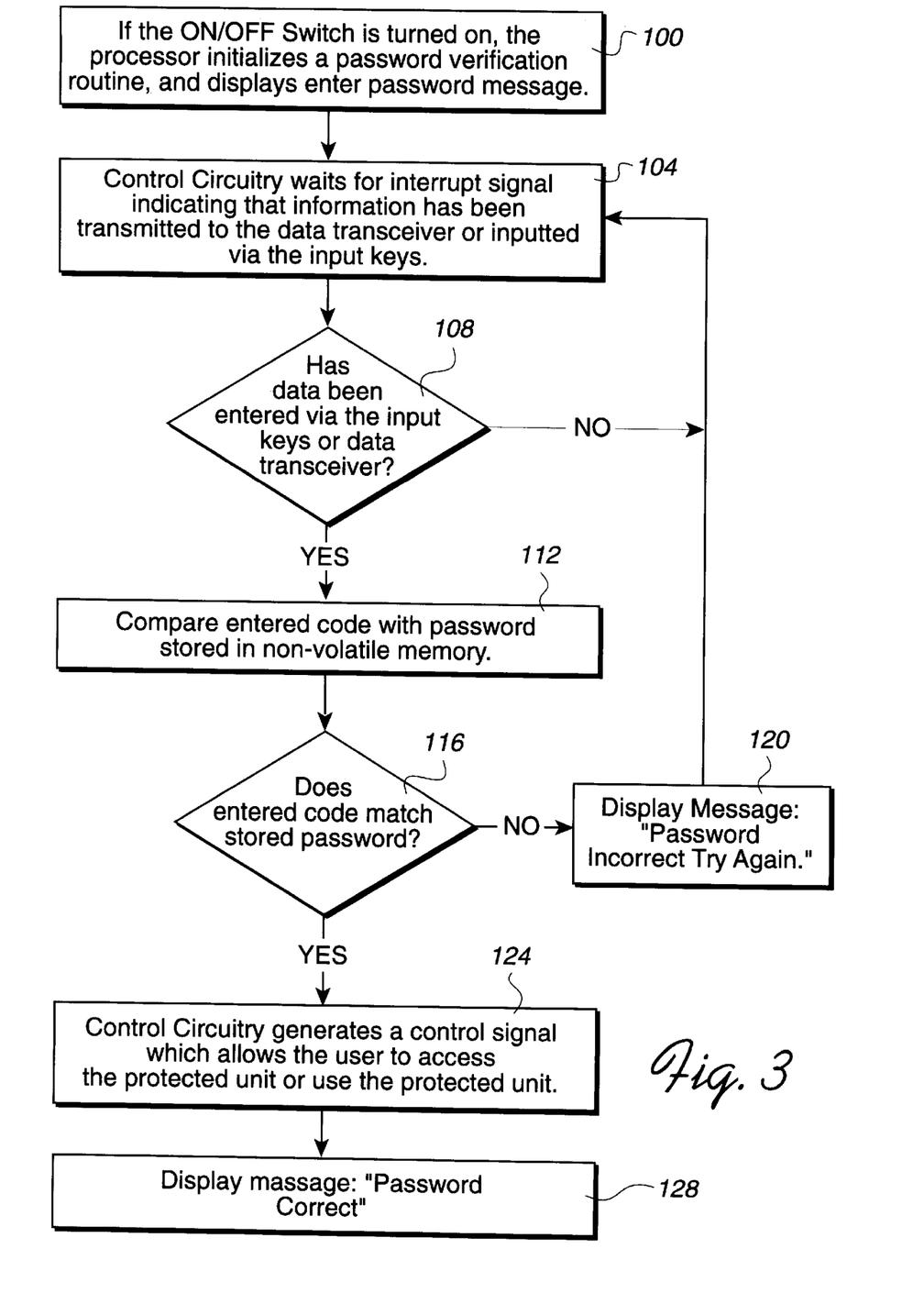
FIG. 3 is a flow chart illustrating preferred embodiments of a password verification system in accordance with the present invention.

FIG. 3 provides a flow chart of preferred embodiments of a password verification system, wherein the activation unit 54 signals the security components within the protected unit 2 to allow the user to access and/or use the protected unit 2. With reference to FIG. 3, at step 100, the control circuitry 26 initiates a password verification routine. In certain embodiments, the control circuitry 26 may initiate the password verification routine at step 100 upon detecting that an ON/OFF switch (not shown) of the protected unit 2 is switched to the ON mode. In further embodiments, after the data transceiver 22 receives a data transmission, the control circuitry 26 will initialize the password verification routine to determine if the transmitted data is the password. In such case, the data transceiver 22 may remain in a sleep or power reduction mode, such as is known in the art, in between receiving data transmissions.

At step 104, the control circuitry 26 waits for an interrupt signal from either the data transceiver 22 or input keys 16 indicating that a code has been entered, or in the case of the data transceiver 22, data received. At step 108, the control circuitry 26 determines whether a code is entered. In preferred embodiments, the entered code may be maintained in the volatile memory 8 for use by the control circuitry 26. At step 112, the control circuitry 26 compares the entered code with the password stored in the non-volatile read/write memory 12. The control circuitry 26 can use any suitable algorithm for comparing the entered code and stored password. The control circuitry 26 can compare each character entered from the input keys 16 immediately after it is entered with the character in the corresponding position of the password stored in the non-volatile read/write memory 12. Alternatively, the control circuitry 26 can wait until the entire code is entered from the input keys 16 before performing the compare operation. If the control circuitry 26 utilizes the latter compare method, then the user may have to select an input key, from either the activation unit 54 or protected unit 2, to signal the control circuitry 26 that code entry is complete. Other suitable comparing algorithms known in the art can be utilized. The control circuitry 26 may also utilize the volatile memory 8 or any other temporary shift registers during the comparing operation.

At step 116, the control circuitry 26 determines if the entered code and stored password code matches. If there is no match between the entered code and the password stored in the non-volatile read/write memory 12, then at step 120 the control circuitry 26 will cause the display 18 to display the message: "Password Incorrect, Try Again." After displaying this message, the control circuitry 26 will then proceed back to step 104 where it will await the appropriate interrupt signals.

If there is a match between the entered code and password stored in the non-volatile read/write memory 12, then at step 124 the control circuitry 26 transmits a control signal 43 that is needed for the user to access and/or use the protected unit 2. At step 128, the control circuitry 26 will cause the display of the message "Password Correct." Thereafter, the user may access or use the protected unit 2.

The operation within the protected unit 2 that the control signal 43 affects is determined by the nature of the protected unit 2. For instance, if the protected unit 2 is a house or automobile, then the control signal 43 generated by the control circuitry 26 upon proper password entry may disable an alarm system associated with the protected unit 2, thereby allowing the user to access the house or automobile without triggering the alarm.

Figure 4A:
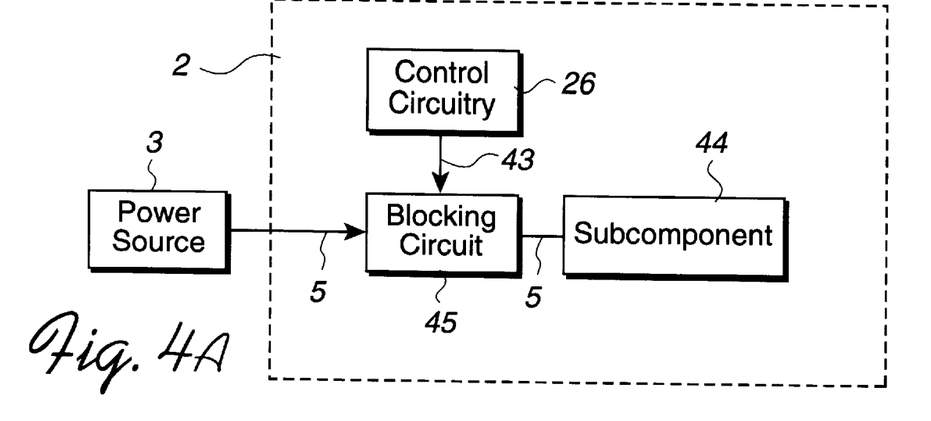
FIGS. 4a, b, and c are schematic block diagrams of the arrangement of a subcomponent within the protected unit in relation to the security system.
Figure 4B:
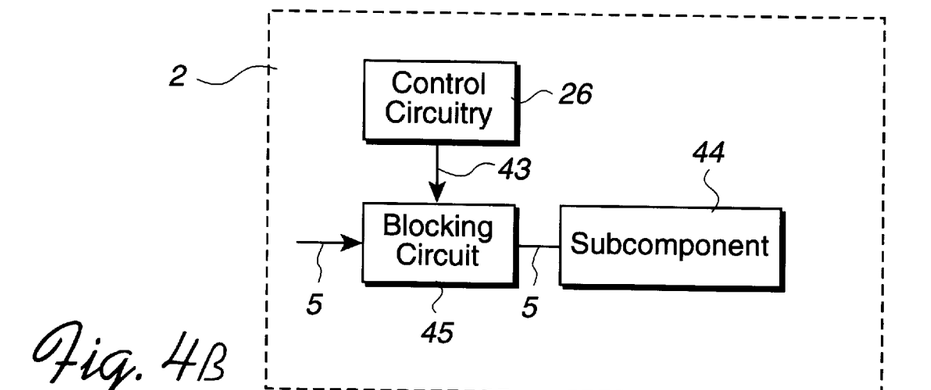
Figure 4C:
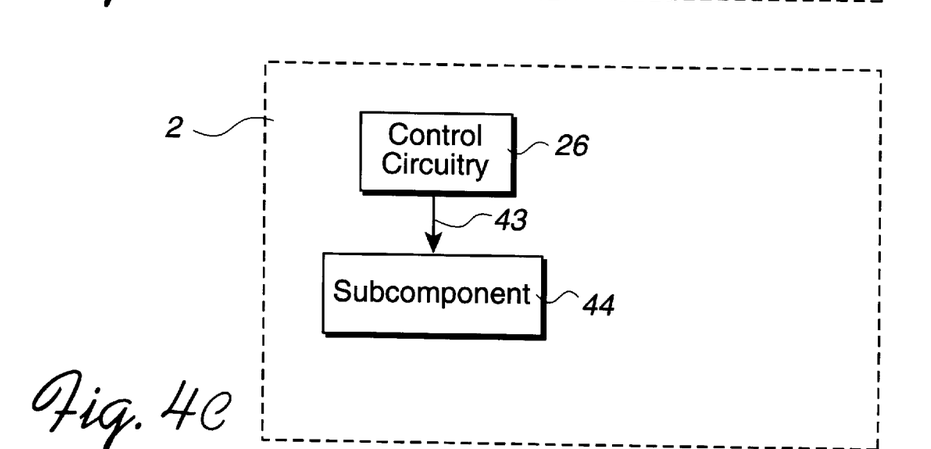

FIGS. 4a–c illustrate preferred embodiments of how the control signal 43 may affect the operation of the protected unit 2. With reference to FIG. 4a, the protected unit 2 further includes an electronic subcomponent 44 and a blocking circuit 45. The blocking circuit 45 may be comprised of various gates and switches. The blocking circuit 45 is coupled to the control signal 43, power source 3, which may be internal or external to the protected unit 2, the subcomponent 44, and a power line 5 providing power from the power source 3 to the subcomponent 44. Upon entry of the password, the control circuitry 26 generates the control signal 43 to enable the blocking circuit 43 to allow power to flow to the subcomponent 44 via the power line 5. This subcomponent 44 is essential to the normal operation of the protected unit 2. Thus, the protected unit 2 will not fully function until the subcomponent 44 receives power via the power line 5. In certain embodiments, the subcomponent 44 may be a plurality of subcomponents or some portion of the protected unit. For instance, a blocking circuit 45 may prevent power from flowing to an automobile ignition switch to prevent the car from starting until the blocking circuit 45 receives control signal 43 generated upon password entry. In this way, the automobile cannot be started until the proper password is entered.

In FIG. 4b, the blocking circuit 45 is coupled between the subcomponent 44 and a source of data or control signals which flows to the subcomponent 44 via line 5. The source of the data or control signals flowing along line 5 may be from the control circuitry 26 or some other subcomponent or circuit within the protected unit 2. The subcomponent 44 will not receive the necessary data or control signals via line 5 which control the operation of the subcomponent 44 until the blocking circuit receives the control signal 43 from the control circuitry 26. Because the subcomponent 44 is essential to the normal operation of the protected unit 2, the protected unit 2 will not fully function until the subcomponent 44 receives data and control signals via line 5 through the blocking circuit 45.

In FIG. 4c, the control circuitry 26 supplies data and control signals 43 to the subcomponent 44. Only upon entry of the password, will the control circuitry 26 provide the control signal 43 to the subcomponent 44. In this way, the control circuitry 26 delays proceeding to further user requested operations until the proper password is entered.

It should be appreciated that when implemented, there may be numerous gates, switches, and transistors regulating the flow of signals and power within the protected unit. Although such intermediary microelectronics are not shown, their use would not affect the overall performance of the present invention.

Figure 5:
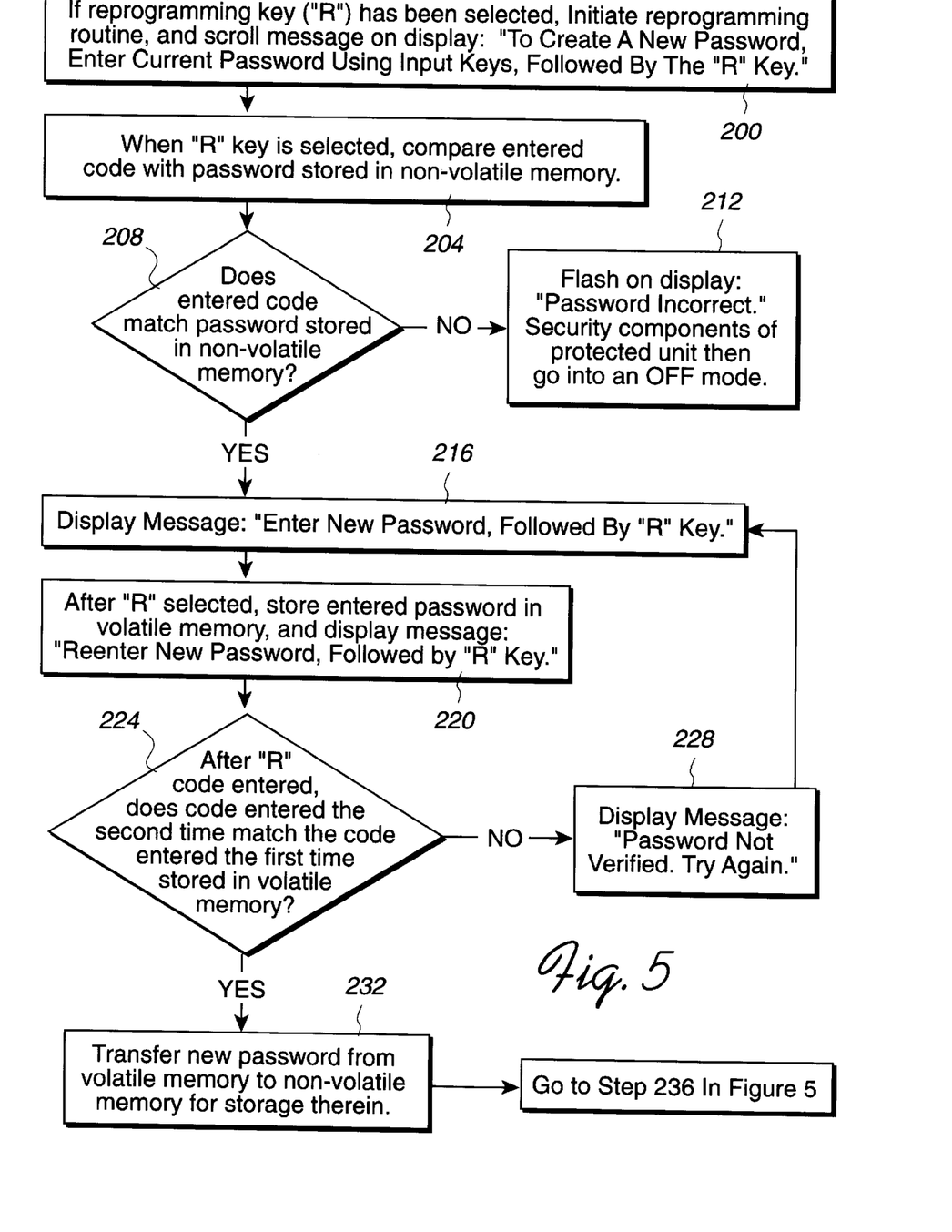
FIGS. 5 and 6 are flow charts illustrating preferred embodiments of a system for programming a code in the protected unit and remote activation unit.

A system for programming the password stored in the security system components within the protected unit 2 is described with reference to FIGS. 5 and 6. Steps 200–232 concern the programming of a password code in the protected unit 2 and are described with reference to FIG. 5. Steps 236–260 concern the programming of the entered password code in the activation unit 54 and are described with reference to FIG. 6.

In preferred embodiments, one of the input keys 16 of the protected unit 2 (not shown) may be designated as the key which allows the user to initiate password programming operations. This key is referred to herein as the programming key ("R"). At step 200, upon the selection of the "R" key, the control circuitry 26 causes the display on display 18: "To Create A New Password, Enter Current Password Using Input Keys, Followed By The "R" Key. " In alternative embodiments, the activation unit 54, or some other remote unit capable of communicating data with the protected unit, may have a plurality of input keys, including the "R" key.

At step 204, the control circuitry 26 awaits a signal from the "R" key. After the "R" key is selected, the control circuitry 26 compares the entered code with the password stored in the non-volatile memory 12. At step 208, the control circuitry 26 determines if there is a match. If there is not a match, then at step 212, the message "Password Incorrect" is displayed. If there is no match, then at step 212 the control circuitry 26 may cause the protected unit 2 to go into an OFF mode. If there is a match, then at step 216, the control circuitry 26 displays the message: "Enter New Password, Followed By The "R" Key."

At step 220, after the "R" key is again selected, the control circuitry 26 causes the storage of the entered new password in the volatile memory 8 and then displays the message: "Reenter New Password, Followed By The "R" Key." After the "R" key is again entered, at step 224, the control circuitry 26 determines whether the code entered the second time matches the new password stored in the volatile memory 8. If there is no match, then the control circuitry 26 proceeds to step 228 where it displays the message: "Reentered Password Different Than First Time, Try Again." The control circuitry 26 then goes to step 216 to allow the user to reenter the new password.

If there is a match at step 224, then the control circuitry 26 proceeds to step 232 where it writes the new password stored in the volatile memory 8 into the non-volatile memory 12 for storage therein.

Figure 6:
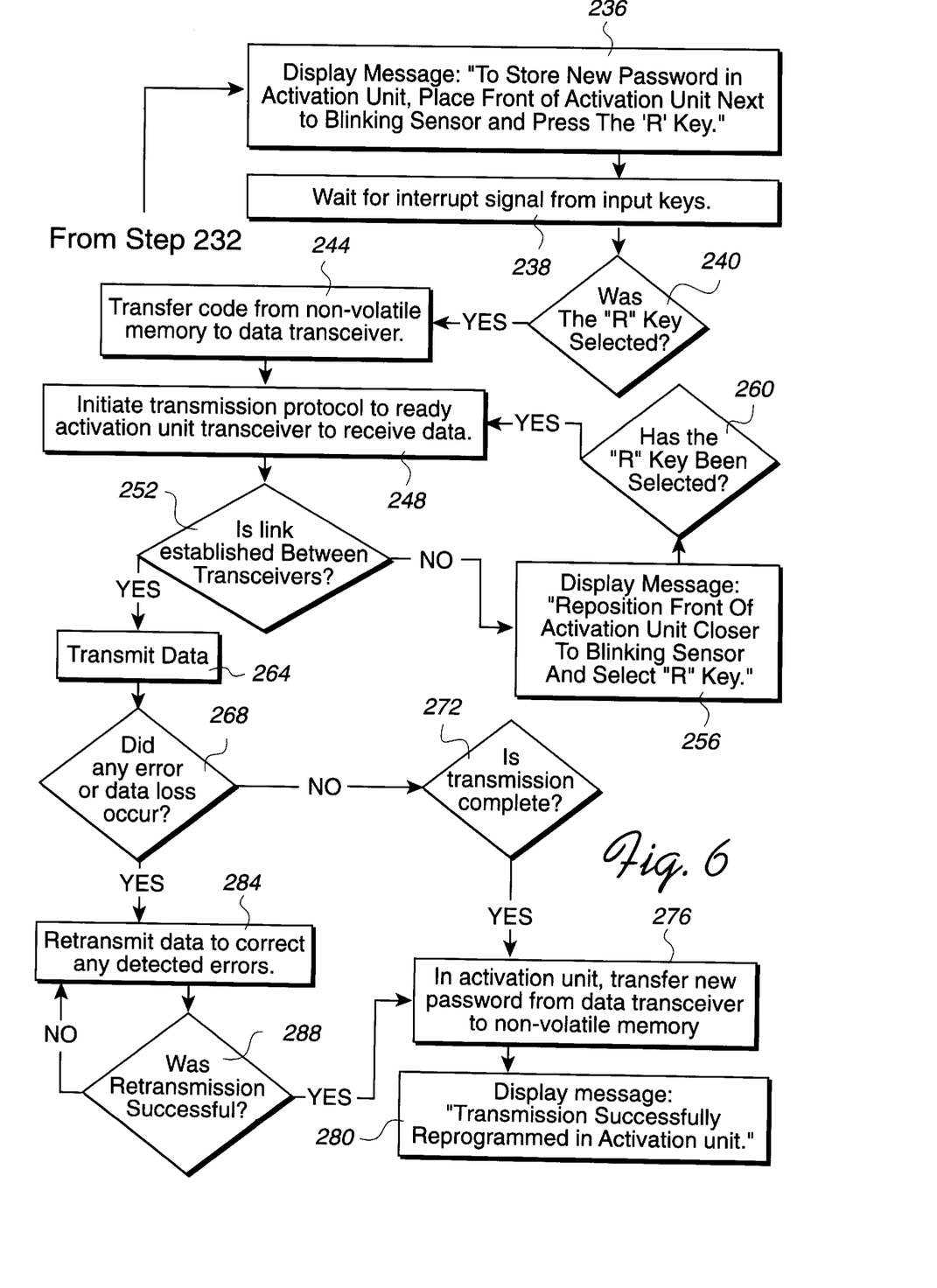

FIG. 6 shows preferred embodiments of how the entered password code may be programmed in the activation unit 54. With reference to FIG. 6, at step 236, the control circuitry 26 begins the process of programming the activation unit 54 with the new password. At step 236, the control circuitry 26 causes the display of the message: "To Store New Password in Activation Unit, Place Front of Activation Unit Near Protected Unit And Then Press The "R" Key." In certain embodiments, the protected unit 2 may have a blinking red light near the communication port to guide where the user should place the remote activation unit 54 during programming operations. At step 238, the control circuitry 26 awaits an interrupt signal from the input keys 16. At step 240, the control circuitry 26 determines if the "R" key was selected. If the "R" key is selected, then at step 244 the control circuitry 26 causes the transfer of the new password from the non-volatile memory 12 to the data transceiver 22.

Steps 248–288 describe the transmission protocol of the data transceivers 22 and 60. At step 248, the data transceiver 22 initiates the transmission protocol to establish a link between the data transceivers 22, 60. At step 252, the data transceiver 22 determines if a link has been established. If a link has not been established, then at step 256 the control circuitry 26 causes the display of the message: "Reposition Front of Activation Unit Closer To Protected Unit And Select "R" Key." If the control circuitry 26 determines that the "R" key has been selected at step 260, then the data transceiver 22 returns to step 252 to initiate the transmission protocol.

If at step 252, the data transceiver 22 determines that a link has been established, then at step 264, the data transceiver 22 transmits data to the data transceiver 60 in the activation unit 54. At step 268, during the transmission of data, the data transceiver 22 monitors whether any data loss has occurred. If there is no data loss, then data transceivers 22 and 60 determine at step 272 whether the transmission is complete. If the transmission of the new password is successfully completed, then at step 276 in the activation unit 54, the data transceiver 60 communicates the new password to the non-volatile read/write memory 68 for storage therein. At step 280, the control circuitry 26 causes the display on display 18 the message that the transmission was successful.

If at step 268 the data transceiver 22 determines that data loss or transmission errors occurred, then at step 284 the data transceiver 22 will retransmit the lost data to correct the transmission errors. At step 288, the data transceiver 22 determines if the retransmission was successful. If it was not successful, then the data transceiver returns to step 284 to retransmit again to correct any transmission errors. If the transmission was successful, then the control circuitry 56 in the activation unit 54 proceeds to step 276 to transfer the new password from the data transceiver 60 in the non-volatile memory 68.

In alternative embodiments, in order to enter a new password to the non-volatile read/write memory 12 of the protected unit, the user may enter information unrelated to the current password, and does not have to reenter the current password first to enter a new password. For instance, the user may enter alternative identification information maintained in the memory or a sequence of input keys to program a new password code in the memory. It should be appreciated that alternative or additional steps may be involved in the password verification and password programming systems, and that the password verification and programming systems of the present invention are not limited solely to the exact steps disclosed in FIGS. 4–6.

In further embodiments, after the security system has been activated, the control circuitry 26 will cause the display on display 18 a message such as "PASSWORD NEEDED." The purpose of this message is to signal potential thieves that the protected unit 2 cannot be accessed or used until a security password is entered.

In alternative embodiments for programming the password, the control circuitry 26 of the protected unit 2 will automatically transfer the new password to the remote activation unit 54 when a user attempts to access the protected unit 2 with the remote activation unit 54 transmitting the previous password. Such a system would be useful when the protected unit 2 is accessed by a group of users, each having their own remote activation unit 54. The protected unit 2 would retain the old password in the non-volatile memory 12 along with the new password. When each user attempts to access the protected unit 2 with the remote activation unit 54 by causing the transfer of the old password stored in the non-volatile read/write memory 68 of the remote activation unit 54 to the protected unit 2, then the control circuitry 26 of the protected unit 2 will transfer the new password stored in the non-volatile memory read/write 12 to the remote activation unit 54 via data transceivers 22, 60 for storage within the non-volatile memory 68 of the remote activation unit 54. In this way, an entire group of remote activation units 54 can be programmed automatically for each user in the group. The protected unit 2 may include a switch, input key or code which would allow a system administrator to cause the protected unit 2 to stop transmitting the new password in response to receiving the old password from remote activation units 54.

In still further embodiments, the memories 12, 68 of the activation unit 54 and protected unit 2 can store one or more passwords. In such case, if the code transmitted from the activation unit 54 matches at least one of the codes or a specified set of codes stored in the memory 12 of the protected unit 2, then the control circuitry 26 will generate the control signal 43.

Moreover, the activation unit 54 may be associated with a plurality of protected units 2. Thus, the user may access numerous protected units 2, such as a stereo, car, house, etc, using a single activation unit 54. The present invention is especially suited for such a universal activation unit 54 because the user may immediately program a new password in the activation unit and protected units if the user loses the universal activation unit 54 or wants to prevent access by someone who has an activation unit.

If the control circuitry for the protected unit 26 and/or the activation unit 56 is implemented in a microprocessor operating under stored program control, then each of the above described steps performed by the control circuitry 26, 56 would be programmed into sets of computer instructions to control the processors 26, 56 to perform the above described steps. These programs for carrying out the above described steps can be stored in a ROM internal or external to the processor or, alternatively, in a portion of the non-volatile read/write memories 12, 68.

Further, both the activation unit 54 and protected unit 2 may store a write command within a ROM or other suitable memory device, such as the non-volatile memories 12, 68. This write command would cause the control circuitry 56 of the activation unit 54 to store the new password received at the data transceiver 60 in the non-volatile read/write memory 68 in place of the old password. The control circuitry 26 of the protected unit 2 would cause the data transceiver 22 to transmit the write command along with the new password to the remote activation unit 54. Thus, when the data transceiver 60 of the activation unit 54 receives the new password and write command, the control circuitry 56 would store the new password in the non-volatile memory 68 of the activation unit 54. If the control circuitry 56, 26 is implemented in a processor operating under stored program control, then the write command may be in the processor ROM.

Second Set of Embodiments

Figure 7:
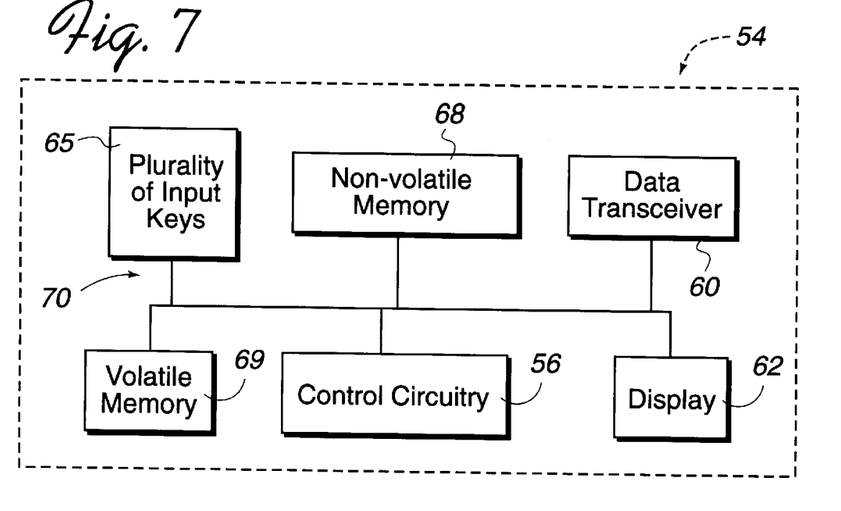
FIG. 7 is a schematic block diagram of the components of a remote activation unit in accordance with preferred embodiments of the present invention.

In a second set of embodiments, the activation unit 54 performs many of the steps in the password programming system of FIG. 6. A preferred embodiment of the activation of the second set of embodiments is shown in FIG. 7. The activation unit 54 shown in FIG. 7 includes the components of the activation unit shown in FIG. 2 and further includes a plurality of input keys 65, a display 62, and a volatile memory 69. The input keys 65 may correspond to alphanumeric characters or the input keys may be used to scroll through a list of alphanumeric characters to select the characters of the password. In this second set of embodiments, the control circuitry 56 of the activation unit 54 would compare the code entered with the input keys 65 and determine if it matches the password stored in the non-volatile memory 68.

If there is a match, then the data transceiver 60 of the activation unit 54 would communicate a signal to the data transceiver 22 of the protected unit 2 that the password has been verified. After the data transceiver 22 of the protected unit 2 receives the password correct signal from the activation unit 54, then the control circuitry 26 in response thereto generates the signal 43 to permit the user to access the protected unit 2 or initiate all user requested functions. Alternatively, the activation unit 54 can transmit the password to the protected unit 2, whose control circuitry 26 then determines if the transmitted password matches the password stored in the non-volatile read/write memory 12.

If the control circuitry 56 of the activation unit 54 determines that the code entered with the input keys 65 does not match the password stored in the non-volatile memory 68, then the display 62 of the activation unit 54 displays a message "Password Incorrect." In the second set of embodiments, the activation unit 54 performs many of the password programming functions of the protected unit 2 described in the first set of embodiments. One of the input keys 65 of the activation unit 54 would be the programming "R" key the user selects to initiate password programming operations. After selecting the "R" key, the user would verify the current password at the activation unit 54 in the manner discussed with respect to the control circuitry 26 of the protected unit 2 in the first set of embodiments and FIG. 3. After verifying the password, the control circuitry 56 would cause the display of a message telling the user to enter the new password. The user would use the input keys 65 to enter the new password. The activation unit 54 would then have the user reenter the new password for confirmation. Alternatively, in order to enter a new password to the non-volatile read/write memory 68 of the activation unit 54, the user may select a certain sequence of input keys, different from the current password, and does not have to reenter the current password first to enter a new password.

After confirming the new password, the control circuitry 56 writes the new password in the non-volatile memory 68 of the activation unit 54. The control circuitry 56 would then communicate the new password to the data transceiver 60 of the activation unit 54 for transmittal to the protected unit 2, along with a write command stored in both the activation unit 54 and protected unit 2 in the manner described above. Upon receiving the write command and new password, the control circuitry 26 of the protected unit 2, in response to the write command, writes the new password received by the data transceiver 22 to the non-volatile memory 12 for storage therein.

The security system of the present invention, discussed with respect to the preferred embodiments, can be used to protect numerous types of units and electronic devices. For instance, the programmable security system of the present invention could be used to protect an automobile. The display 18, input keys 16, control circuitry 26, volatile memory 8, non-volatile memory 12, and data transceiver 22 shown in FIG. 1 and discussed above could be located somewhere on the dashboard of the car. Once the password is entered via the activation unit 54 or input keys 16, the control circuitry 26 would generate a control signal 43 which would disable the alarm system or, alternatively, affect certain circuits which would allow the ignition switch to fire. Use of security systems to control the ignition of an automobile are disclosed in U.S. Pat. No. 4,366,466 to Horst Lutz, entitled "Apparatus for Preventing Unauthorized Starting of a Motor Vehicle."

In further embodiments, the security system of the present invention could be used with any electronic device including at least the volatile memory 8, non-volatile memory 12, input keys 16, display 18, data transceiver 22, control circuitry 26, and power source 2. With reference to FIGS. 4a and 4b, the control signal 43 generated by the control circuitry 26 could affect the device by enabling a blocking circuit 45 to allow power or data to flow to subcomponent 44 within the protected electronic device. Alternatively, as shown in FIG. 4c, the control signal 43 may be a control signal that is needed in order for the protected device to perform user requested commands.

The security system of the present invention could also be used to protect a house or other building. The volatile memory 8, non-volatile memory 12, input keys 16, display 18, data transceiver 22, control circuitry 26, and power source 2 would be located within a portion of the house. The input keys 16, data transceiver 22, and display 18 could be accessible from the outside of the building. The user would deactivate an alarm for the building with the activation unit 54 and be able to program the password for the building 2 and activation unit 54 as discussed above.

Figure 8:
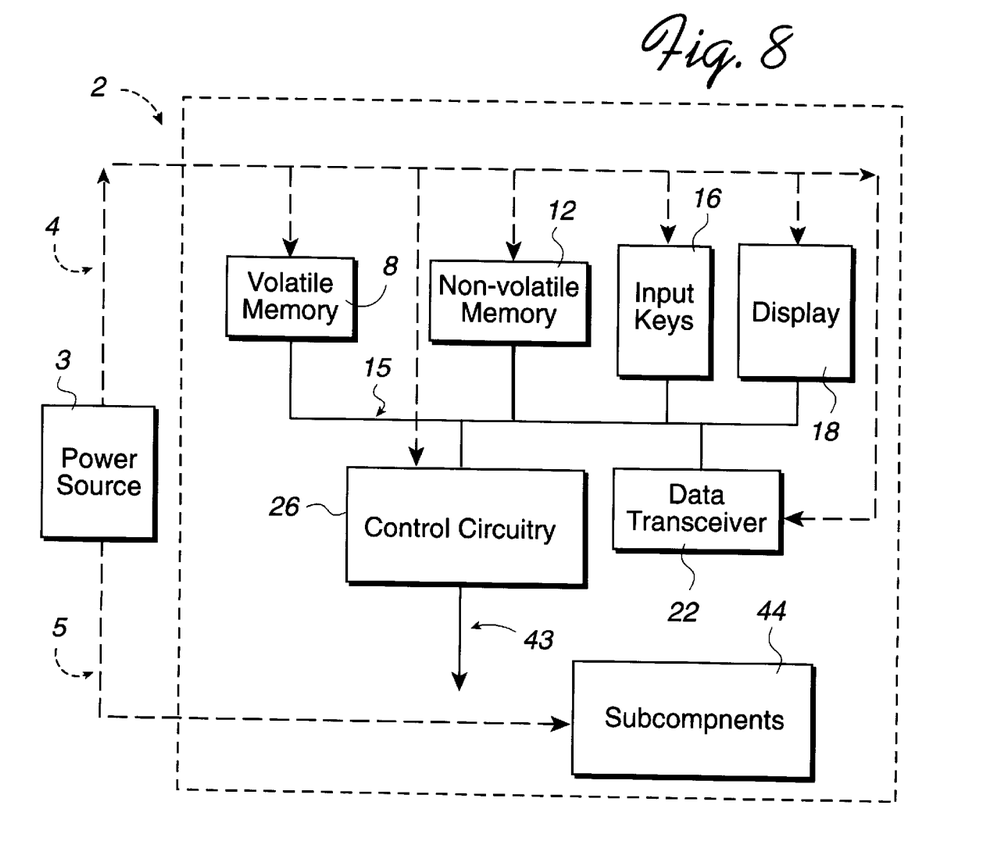
FIG. 8 is a schematic block diagram of how the components of the security system of the present invention may be located within a car stereo.

Yet further, the security system of the present invention could be used to protect a car stereo. FIG. 8 shows how the security system components may be located within a car stereo. The volatile memory 8, non-volatile memory 12, input keys 16, display 18, data transceiver 22, control circuitry 26, and power source 2 would be part of the car stereo. The input keys 16 would be the station select buttons. Further, the control circuitry 26 would be the control unit for all car stereo functions. The car stereo 2 further includes various subcomponents 44, such as a tape deck, CD player, amplifiers and AM/FM tuner. The power source 2 would be the car battery. To use the car stereo, the user would have to use the remote activation unit 54 or input keys 16 to communicate the password to the car stereo. Car stereos typically include two power lines extending from the battery, one power line 4 to continuously power the memory and a microprocessor (usually called a Memory Backup Lead because it provides for the continual storage of settings for the stereo) and another power line 5 to provide power to the subcomponents 44, depending on whether the ignition switch is turned on or off, or in the accessory position (usually called the Power Lead).

The security system could activate the car stereo in the manner discussed with reference to FIGS. 4a–c, wherein the subcomponents 44 may be any one or more of the subcomponents within the car stereo 2, such as the tape deck, CD player, amplifiers and/or AM/FM tuner. In further embodiments, the user could use the input keys 16 to enter the password to enable the car stereo if the remote activation 54 unit is lost or unavailable.

Third Set of Embodiments

In a third set of preferred embodiments, the protected unit and remote activation unit may be structured and operate as discussed above with respect to the first and second embodiments, except that instead of having data transceivers 22, 60 for wireless data communication between the activation unit 54 and the protected unit 2, the data transceivers 22, 60 may be replaced with data ports. In such case, a data communication line would link the data port of the protected unit and data port of the activation to allow data communication therebetween in the manner discussed above. In yet further embodiments, the port of the remote activation unit may physically mate with the data port of the protected unit to provide data communication therebetween, thereby dispensing with the need for a data communication line. The ports used in lieu of the data transceivers 22, 60 may be any suitable data transfer port known in the art, such as a serial or parallel port.

Fourth Set of Preferred Embodiments

In a fourth set of preferred embodiments, the activation unit 54 would not have an input key. Instead, the protected unit 2 would be able to detect whether a communication link is established with the activation unit 54. In fact the IrLAP protocol promoted by the IrDA contemplates a primary unit which is always active and "sniffs out" whether another device is in communication range. The protected unit 2 can function as the primary unit, sniffing out activation units 54 and exchanging information with the activation unit to establish a communication link. After establishing a link, the protected unit 2 would request the activation unit 54 to transmit the password stored in its non-volatile memory 68. Further, during the initiation of programming operations, after establishing a communication link with the remote activation unit 54, the protected unit 2 would communicate the new password to the activation unit 54 for storage therein.

For instance, if the communication ports of the protected unit 2 and activation unit 54 are data transceivers 22, 60 providing for wireless communication, the data transceiver 22 of the protected unit 2 can transmit signals to establish contact with the remote activation unit 54. Once the data transceiver 60 of the activation unit 54 receives one of these transmitted signals, it then transmits a signal back to the protected unit 2 indicating that a communication link may be established. After the data transceiver 22 of the protected unit 2 establishes a communication link, then the protected unit 2 may transmit a signal requesting the activation unit 54 to transmit its password stored in memory 68 or transmit the new password to the activation unit 54 for storage in the non-volatile memory 68 of the activation unit 54. In this way, the user can access the protected unit 2 by positioning the activation unit 54 near the protected unit 2 without having to depress an input key.

Alternatively, if the remote activation unit 54 and protected unit 2 have data ports for direct communication linked by physically mating the data ports of the protected unit and activation unit 54 or linking the data ports via a data communication line, then the protected unit 2 can request the password from the remote activation unit 54 or program the remote activation unit 54 after the protected unit 2 determines that a communication link via the data ports has been established.

The desirability of the first, second, third, and fourth sets of embodiments is evident. With the first and second embodiments, users may easily "unlock" the protected unit by merely depressing a button on the remote activation unit 54, or in the fourth set of embodiments, locating the activation unit 54 in the line of data communication of the protected unit 2. With the third set of embodiments users need merely mate the remote activation unit to a data communication line or physically to the protected unit to perform access and password programming operations. Moreover, users can easily program a new password in their protected unit 2 and activation unit 54 if they lose their activation unit 54 or want to prevent access by someone who knows the password and/or has an activation unit.

Because the user can select a password that they will easily remember, no longer will users have to worry about forgetting the password if they have to manually renter it. Still further, because the activation units 54 may be comprised of relatively inexpensive components, they may be easily and inexpensively replaced and programmed if lost.

For car stereos, the security system of the present invention is particularly advantageous because no longer do drivers have to carry around a removable face plate, which if lost can cost a couple hundred dollars to replace. Yet further, if the user does not have the activation unit readily available or has lost the activation unit, the user can immediately access or use the protected unit by using the input keys to enter the password. Still further, unlike the removable face plate which can be cumbersome to carry around, especially for those who do not have a purse or bag, the activation unit may be small and placed on a key ring or located in a watch for convenience.

It will, of course be understood that further modifications of the present invention in its various aspects, will be apparent to those skilled in the art, some being apparent only after study and others being matters of routine electronic and mechanical design. Other embodiments are also possible, their specific designs depending upon the particular application. As such, the scope of the invention should not be limited by the particular embodiment herein described but should be defined only by the appended claims and equivalents thereof.

What is claimed:

1. A security system for protecting a protected unit, including an activation unit, comprising:
   the activation unit, including:
      i. a memory storing a code;
      ii. a data port;
      iii. control circuitry coupled to the memory and the data port, including:
         (a) means for communicating the code stored in the memory to the data port;
         (b) means for causing the data port to communicate data to another data port; and
         (c) means for writing data communicated from the data port to the memory;
   the protected unit, including:
      (i) a memory storing a code;
      (ii) an input means;
      (iii) a data port for bi-directional communication with the data port of the activation unit;
      (iv) control circuitry in communication with the memory, the input means, and the data port, including:
         (a) means for determining if a code communicated to the protected unit is identical to a code stored in the memory;
         (b) means for generating a control signal which controls an operation within the protected unit if the code communicated to the protected unit matches a code stored in the memory;
         (c) means for writing a code entered with the input means in the memory of the protected unit;
         (d) means for communicating the entered code to the data port of the protected unit; and
         (e) means for causing the data port to communicate the entered code to the data port of the activation unit,
   wherein the control circuitry of the activation unit writes the entered code communicated from the protected unit to the memory of the activation unit.

2. The security system of claim 1, wherein the input means is a plurality of user selectable input keys.

3. The security system of claim 1, wherein the control circuitry of the protected unit and activation unit further includes means for replacing a code stored in the activation unit memory and the protected unit memory with the entered code.

4. The security system of claim 1, wherein the activation unit further includes a user selectable input key coupled to the control circuitry, and the control circuitry of the activation unit further includes means for communicating the code stored in the memory of the activation unit to the data port in response to the selection of the input key.

5. The security system of claim 1, wherein the control circuitry of the activation unit further includes a means for communicating the code stored in the memory of the activation unit in response to a request for such code from the protected unit via the data ports.

6. The security system of claim 1, wherein the data ports of the activation unit and protected unit are data transceivers providing wireless data communication therebetween.

7. The security system of claim 1, further including a data communication line coupled to the data ports of the activation unit and protected unit to provide data communication therebetween.

8. The security system of claim 1, wherein the data port of the activation unit physically mates with the data port of the protected unit to provide data communication therebetween.

9. The security system of claim 1, wherein the entered code is selectively entered with the input keys of the protected unit.

10. The security system of claim 1, wherein the control circuitry of the protected unit includes means for determining if a code communicated from the input keys and the data port of the protected unit matches a code stored in the memory of the protected unit.

11. The security system of claim 1, wherein the memory in the activation unit is a non-volatile read/write memory and the memory in the protected unit is a non-volatile read/write memory.

12. The security system of claim 1, further including:
a write command which causes the control circuitry of the activation unit to write the data communicated to the data port to the memory of the activation unit;
a memory in the activation unit storing the write command; and
a memory in the protected unit storing the write command.

13. The security system of claim 1, further including an alarm system in communication with the control circuity of the protected unit, wherein the control signal generated upon a match of the code communicated to the protected unit and a code stored in the memory of the protected unit disables the alarm system.

14. The security system of claim 1, wherein the protected unit further includes:
a subcomponent;
a blocking circuit;
a first circuit path coupled to the blocking circuit;
a subcomponent control signal to control the operation of the subcomponent transmitted along the first circuit path;
a second circuit path coupled to the blocking circuit and the subcomponent;
wherein the control signal from the control circuitry causes the blocking circuit to permit the subcomponent control signal from the first circuit path to flow to the subcomponent via the second circuit path.

15. The security system of claim 1, wherein the protected unit further includes:
a subcomponent;
a power source;
a power line coupling power from the power source to the subcomponent; and
a blocking circuit coupled to the control circuity and between the power line and subcomponent, wherein the power line will only couple power from the power source to the subcomponent if the blocking circuit receives the control signal from the control circuitry.

16. The security system of claim 15, wherein the power source is located external to the protected unit and wherein the power line couples power from the power source to the entire protected unit.

17. The security system of claim 16, wherein the blocking circuit is located external to the protected unit, between the protected unit and the power source.

18. The security system of claim 1, wherein the control circuitry of the activation unit and protected unit are implemented in dedicated logic circuits.

19. The security system of claim 1, wherein a portion of the control circuitry of the protected unit and activation unit is implemented in dedicated logic circuits and another portion is implemented as a processor operating under stored program control.

20. A security system for protecting a protected unit, including an activation unit, comprising:
a protected unit, including:
i. a data port;
ii. a memory storing a code;
iii. control circuitry coupled to the memory and data transceiver, including:
(a) means for generating a control signal which controls an operation within the protected unit if a code communicated to the data port matches a code stored in the memory;
(b) means for writing to the memory a code transmitted to the data port;
an activation unit, including:
i. a memory storing a code;
ii. input means;
iii. a data port;
iv. control circuitry coupled to the input keys, memory, and data port, including:
(a) means for writing an entered code selectably entered with the input keys to the memory; and
(b) means for communicating the entered code to the data port for communication to the data port of the protected unit,
wherein the control circuitry of the protected unit writes the entered code entered at the activation in the memory of the protected unit.

21. The security system of claim 20, wherein the input means is a plurality of user selectable input keys.

22. The security system of claim 20, wherein the data ports of the activation unit and protected unit are data transceivers providing wireless data communication therebetween.

23. The security system of claim 20, further including a data communication line coupled to the data ports of the activation unit and protected unit to provide data communication therebetween.

24. The security system of claim 20, wherein the data port of the activation physically mates with the data port of the protected unit to provide data communication therebetween.

25. A method for programming a code within a protected unit and activation unit, and accessing the protected unit, comprising the steps of:
(a) programming a code in the activation unit and protected unit, comprising:
i. determining with control circuitry of the protected unit whether a code has been entered;

ii. if a code has been entered, then storing the entered code in a memory of the protected unit;
iii. communicating the entered code to a data port of the protected unit;
iv. communicating the entered code from the data port of the protected unit to a data port of the activation unit; and
v. storing the entered code communicated from the protected unit in a memory within the activation unit; and (b) accessing the protected unit using the activation unit, comprising:
i. communicating a code stored in the memory of the activation unit to a data port in the activation unit;
ii. communicating the code from the data port of the activation unit to the data port of the protected unit;
iii. determining with control circuitry within the protected unit whether the code communicated from the activation unit matches a code stored in the memory of the protected unit; and
iv. if there is a match between the code communicated from the activation unit and a code stored in the memory of the protected unit, then generating a control signal to control an operation within the protected unit.

26. The method of claim 25, further comprising replacing a code stored in the protected unit memory and the activation unit memory with the entered code.

27. The method of claim 25, wherein the user enters the entered code with a plurality of input keys on the protected unit.

28. The method of claim 25, wherein the code stored in the memory of the activation unit is communicated to the data port in the activation unit in response to the user selecting an input key of the activation unit.

29. The method of claim 25, further including the step of directly mating the data port of the protected unit with the data port of the activation unit to provide data communication therebetween.

30. The method of claim 25, further including the step of coupling the data port of the protected unit and the data port of the activation unit to a data communication line to provide data communication therebetween.

31. A method for programming a code within a protected unit and activation unit, and accessing the protected unit using the activation unit, comprising:

(a) programming a code in the activation unit and protected unit, comprising:
i. determining with control circuitry of the activation unit whether the user has entered a code;
ii. if a code has been entered, then storing the entered code in a memory of the activation unit;
iii. communicating the entered code to a data port of the activation unit;
iv. communicating the entered code from the data port of the activation unit to a data port of the protected unit; and
v. storing the entered code communicated to the data port of the protected unit in a memory within the protected unit;

(b) accessing the protected unit using the activation unit, comprising:
i. communicating a code stored in the memory of the activation unit to a data port in the activation unit;
ii. communicating the code from the data port of the activation unit to the data port of the protected unit;
iii. determining with control circuitry within the protected unit whether the code communicated from the activation unit matches a code stored in the memory of the protected unit; and
iv. if there is a match between the code communicated from the activation unit and a code stored in the memory of the protected unit, then generating a control signal with the control circuitry to control an operation within the protected unit.

32. A method for programming a code within a protected unit and activation unit, and using the activation unit to access the protected unit, comprising:

(a) storing a first code in a memory within the protected unit;
(b) programming a code in the activation unit and protected unit, comprising:
i. determining with control circuitry of the protected unit whether a code has been entered;
ii. if a code has been entered, then storing the entered code in a memory of the protected unit as a second code;
iii. determining with the control circuitry of the protected unit whether a code transmitted from the activation unit matches the first code;
iv. if the code transmitted from the activation unit matches the first code, then communicating the second code to the data port of the protected unit;
v. communicating the second code from the data port of the protected unit to the data port for the activation unit; and
vi. storing with control circuitry of the activation unit the second code communicated from the protected unit within the memory of the activation unit.

(c) accessing the protected unit using the activation unit, comprising:
vii. communicating a code stored in the memory of the activation unit to a data port in the activation unit;
viii. communicating the code from the data port of the activation unit to the data port of the protected unit;
ix. determining with control circuitry within the protected unit whether the code communicated from the activation unit matches a code stored in the memory of the protected unit; and
x. if there is a match between the code communicated from the activation unit and a code stored in the memory of the protected unit, then generating a control signal with the control circuitry to control an operation within the protected unit.

33. A computer usable medium including program statements for use in programming control circuitry to program a code within a protected unit and activation unit, and access the protected unit, wherein the program statements are capable of causing the control circuitry of the activation and protected units to perform the steps of:

(a) programming a code in the activation unit and protected unit by causing the control circuitry of the protected unit and the activation unit to perform the steps of:
i. determining, with control circuitry of the protected unit, whether a code has been entered;
ii. if a code has been entered, then storing, with the control circuitry of the protected unit, the entered code in a memory of the protected unit;
iii. communicating, with the control circuitry of the protected unit, the entered code to a data port of the protected unit;
iv. communicating the entered code from the data port of the protected unit to a data port of the activation unit; and v. storing, with the control circuitry of the activation unit, the entered code communicated from the protected unit in a memory within the activation unit; and (b) accessing the protected unit using the activation unit by causing the control circuitry of the protected unit and the activation unit to perform the steps of:
 i. communicating, with the control circuitry of the activation unit, a code stored in the memory of the activation unit to a data port in the activation unit;
 ii. communicating, with the control circuitry of the protected unit, the code from the data port of the activation unit to the data port of the protected unit;
 iii. determining with control circuitry within the protected unit whether the code communicated from the activation unit matches a code stored in the memory of the protected unit; and
 iv. if there is a match between the code communicated from the activation unit and a code stored in the memory of the protected unit, then generating, with the control circuitry of the protected unit, a control signal to control an operation within the protected unit.

34. The computer usable medium of claim 33, wherein the program statements are further capable of causing the control circuitry of the activation and protected unit to perform the step of replacing a code stored in the protected unit memory and the activation unit memory with the entered code.

35. The computer usable medium of claim 33, wherein the program statements are further capable of causing the control circuitry of the activation unit to perform the step of communicating the code stored in the memory of the activation unit in response to a request for such code from the protected unit via the data ports.

36. A computer usable medium including program statements for use in programming control circuitry to program a code within a protected unit and activation unit, and access the protected unit, wherein the program statements are capable of causing the control circuitry of the activation and protected units to perform the steps of:

(a) programming a code in the activation unit and protected unit by causing the control circuitry of the protected unit and the activation unit to perform the steps of:
 i. determining with the control circuitry of the activation unit whether a code has been entered;
 ii. if a code has been entered, then storing the entered code in a memory of the activation unit;
 iii. communicating the entered code to a data port of the activation unit;
 iv. communicating the entered code from the data port of the activation unit to a data port of the protected unit; and
 v. storing the entered code communicated to the data port of the protected unit in a memory within the protected unit;

(b) accessing the protected unit using the activation unit by causing the control circuitry of the protected unit and the activation unit to perform the steps of:
 i. communicating, with the control circuitry of the activation unit, a code stored in the memory of the activation unit to a data port in the activation unit;
 ii. communicating the code from the data port of the activation unit to the data port of the protected unit;
 iii. determining with the control circuitry within the protected unit whether the code communicated from the activation unit matches a code stored in the memory of the protected unit; and
 iv. if there is a match between the code communicated from the activation unit and a code stored in the memory of the protected unit, then generating a control signal with the control circuitry of the protected unit to control an operation within the protected unit.

* * * * *